Sept. 19, 1933.     L. H. CHURCH     1,927,390
PIPE COUPLER
Filed June 23, 1931     3 Sheets-Sheet 1
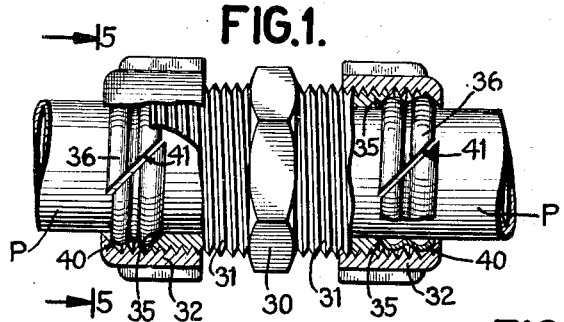
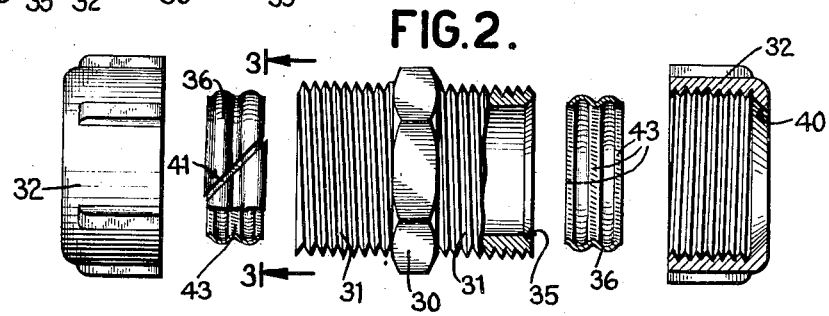
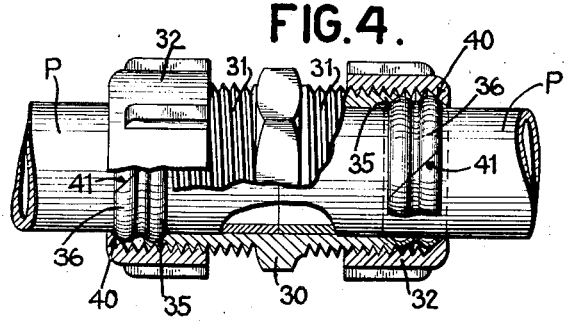
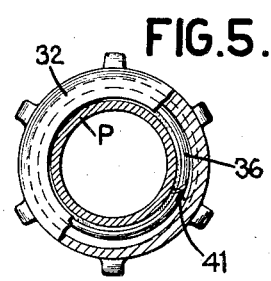
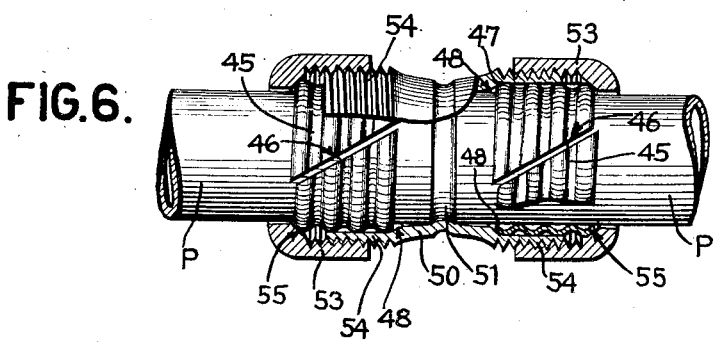
INVENTOR
LEWIS H. CHURCH
BY HIS ATTORNEY
Bohleber & Ledbetter

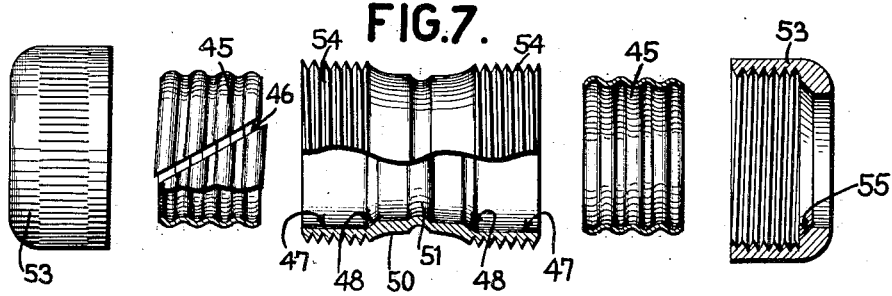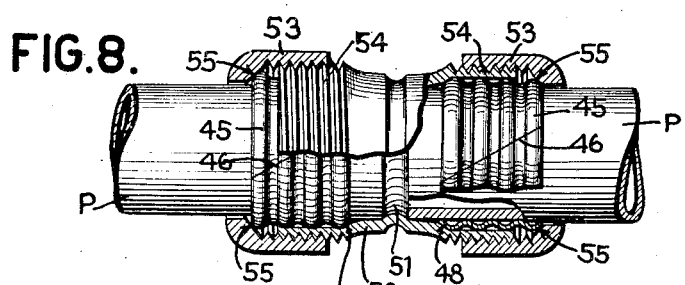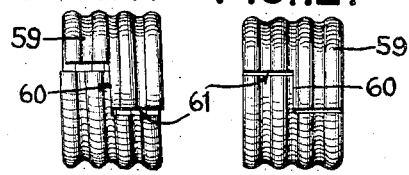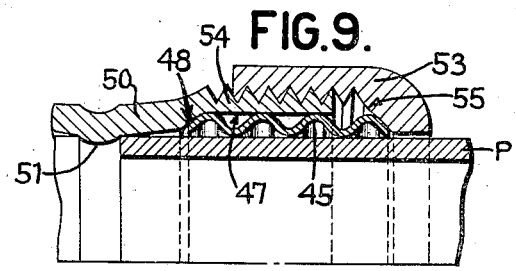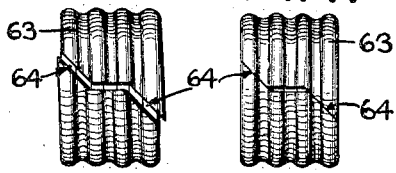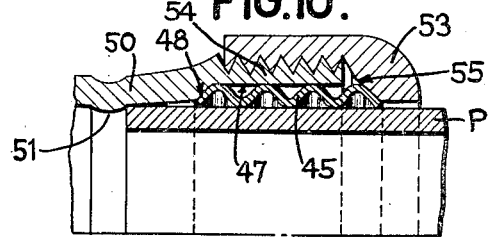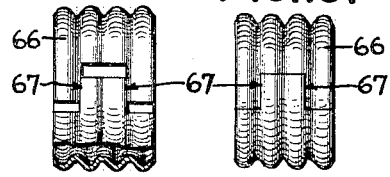

Sept. 19, 1933.  L. H. CHURCH  1,927,390
PIPE COUPLER
Filed June 23, 1931  3 Sheets-Sheet 3
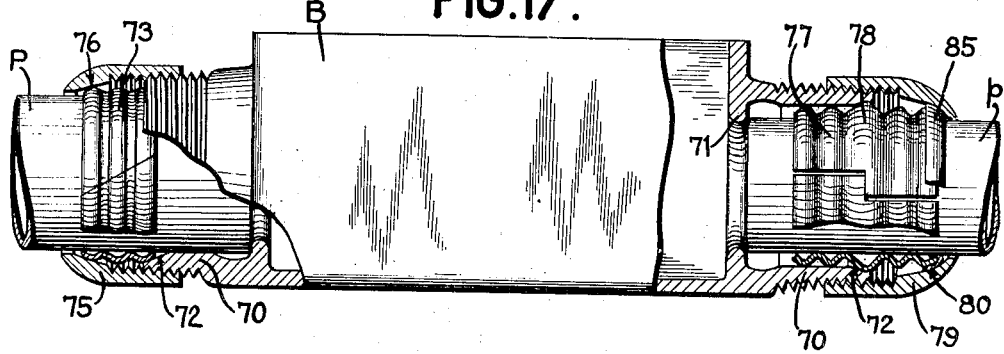
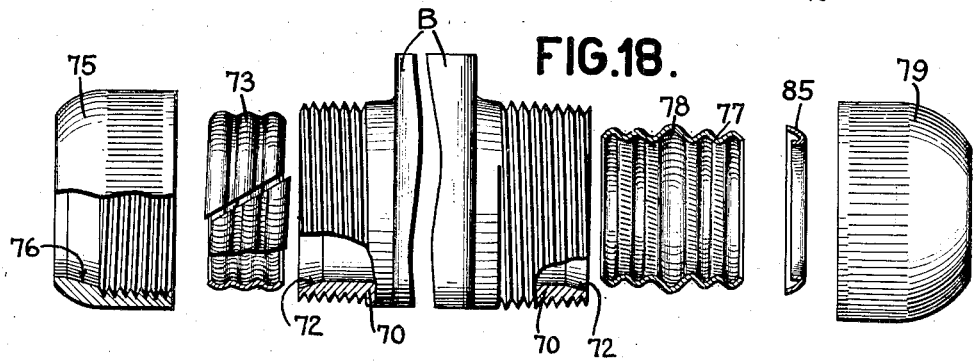
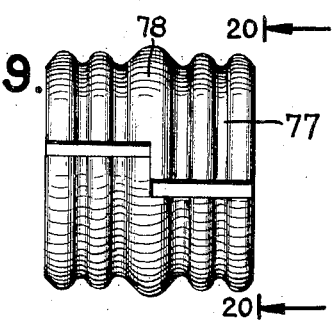
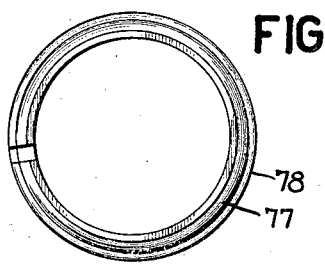
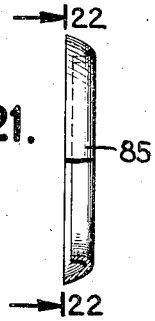
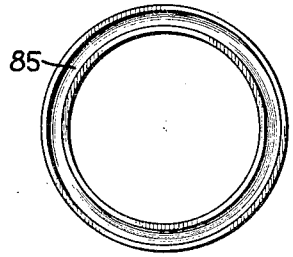
INVENTOR
LEWIS H. CHURCH
BY HIS ATTORNEY
Bohleber & Ledbetter Patented Sept. 19, 1933

1,927,390

UNITED STATES PATENT OFFICE 1,927,390

PIPE COUPLER

Lewis H. Church, Westfield, N. J., assignor to The Thomas & Betts Co., Elizabeth, N. J., a corporation of New Jersey Application June 23, 1931. Serial No. 546,176

10 Claims. (Cl. 285—122)

The invention pertains to couplers by means of which the unthreaded ends of two pipes may be coupled together or the unthreaded end of a single pipe may be coupled to some other structure. The invention pertains in particular to a coupler which has in its preferred form, a corrugated and longitudinally split sleeve which is contracted to grip the unthreaded end of a pipe within the coupler.

An object of the invention is to construct a coupler of new and novel design having a corrugated member which is contracted or whose relative thickness is increased in order to grip the unthreaded end of a pipe within the coupler.

A further object is to provide a pipe coupler having a corrugated sleeve which is rendered flexible by a longitudinal slot and which sleeve is subjected to a double contraction. The double contraction of the sleeve is brought about by the flexibility thereof because of the longitudinal slot and further contraction is obtained by a longitudinal contraction of the sleeve which in turn increases the radial over-all thickness of the sleeve and this brings about a contraction of the inside diameter of the sleeve.

Another object is to construct a corrugated sleeve for use with pipe couplers having a longitudinally extending slot other than a straight slot parallel with the axis of the sleeve, the edges of which corrugated sleeve are offset or otherwise constructed so that the edges thereof are forcibly brought together to form a moisture tight seal when contracted to grip a pipe thereby.

Another object of the invention is to construct a continuous ring of thin material which is received upon the end of a contractile or corrugated sleeve for a pipe coupler in order to provide a completely tight coupling therefor.

Other objects of the invention and the means for their attainment will be more apparent from the following description taken in connection with the accompanying drawings, in which:

Figure 1 is an assembly of the coupler with portions thereof in section showing the position of the parts just prior to anchoring the unthreaded ends of conduit or pipe therein.

Figure 2 is an exploded view of the coupler of Figure 1 with certain parts in section to more clearly show the construction thereof.

Figure 3 is an end view of the corrugated sleeve of the coupler.

Figure 4 is an assembly of the coupler in which the unthreaded ends of two pipes have been clamped therein with parts of the coupler in section to more clearly show the construction and action thereof.

Figure 5 is an end view of the coupler with portions thereof in section showing the corrugated ring within the coupler.

Figure 6 is an assembly of a coupler of somewhat different construction from that shown in Figures 1 through 5 with the parts in position preparatory to finally anchoring the pipes therein.

Figure 7 is an exploded view of the coupler of Figure 6 with certain parts in section in order to more clearly show the construction of the parts and their interrelation.

Figure 8 is an assembly of the coupler of Figure 6 with some of the parts shown in partial section in the interest of clarity and showing the position of the parts after the coupler has been tightened to anchor the unthreaded ends of two pipes therein.

Figure 9 is an enlarged and partial cross-section of the coupler of Figure 8 showing the position of the corrugated sleeve after partial contraction but before it has been longitudinally contracted to finally grip a pipe therein.

Figure 10 is an enlarged and partial cross-section of the coupler of Figure 8 after the coupler has been tightened and double contraction of the sleeve has taken place in order to firmly grip the pipe therein.

Figure 11 shows a corrugated sleeve having a zigzag longitudinally extending slot therein in which a portion of the slot extends circumferentially of the sleeve.

Figure 12 shows the corrugated sleeve of Figure 11 partially contracted for gripping a pipe therein.

Figure 13 is a view showing a corrugated sleeve uncontracted and having a longitudinally extending slot portions of which are at an angle to the axis of the sleeve.

Figure 14 shows the corrugated sleeve of Figure 13 partially contracted so that the slot is closed.

Figure 15 shows another construction of corrugated sleeve having at least two portions of the longitudinally extending slot extending circumferentially thereof.

Figure 16 shows the sleeve of Figure 15 partially closed for pipe gripping action with the edges of the sleeve contacting at the slot.

Figure 17 is a view of two forms of pipe couplers by means of which the unthreaded end of a pipe is secured to a box. Portions of the box and couplers are in section in order to more clearly show the construction thereof. A different form of corrugated sleeve is also shown in this constrution.

Figure 18 is an exploded view of the couplers of Figure 17.

Figure 19 shows one of the corrugated sleeves used in one of the couplers of Figures 17 and 18.

Figure 20 is an end view of the sleeve of Figure 19.

Figure 21 shows the sealing ring which is received upon the end of the corrugated sleeve.

Figure 22 is an end view of the ring of Figure 21 taken from the line 22—22 of Figure 21.

In coupling the unthreaded ends of two pipes together or in coupling the unthreaded end of a single pipe to some other structure, such as an outlet box, the coupler must be able to withstand a longitudinal pull which is quite considerable. The couplers of this type frequently make use of a contractile sleeve which grips the unthreaded ends of the pipe within the coupler. The coupler to be described herein in the preferred construction is of the contractile sleeve type but obtains a double contraction of the sleeve and thereby secures an efficient and powerful gripping action upon an unthreaded pipe end.

The coupler shown in Figure 1 consists of a coupler member or sleeve 30 having openings therein to receive the unthreaded ends of the pipes P. The coupler member carries the threads 31 upon its ends to receive the threaded nuts 32, each nut constituting an operating member movable longitudinally of the coupler member. Each end of the coupler member 30 carries a taper 35 against each of which one end of a corrugated sleeve 36 abuts. Each taper may also be said to engage one end of a corrugated sleeve 36.

Each of the coupler nuts or operating members 32 is also provided with a taper 40 which engages the other end of the corrugated sleeve or member 36 upon longitudinal movement of the nut relatively to the coupler member. The nuts 32 are then taper operating means or members. The relative longitudinal movement is obtained in the construction shown by means of the screw threads on the nut engaging the threaded ends 31 of the coupler member. Each corrugated sleeve 36 has a longitudinal split 41 which renders the sleeve flexible and enables it to be contracted because of its flexibility. The corrugated sleeve or member 36 is shown with two corrugations, although the number of such corrugations may be greater if desired. The inner ridges of the corrugated sleeve 36 may carry the knurling 43 which grips into the pipe and more firmly secures the pipe within the coupler as well as biting beneath the external surface thereof to obtain good electrical contact therewith.

In assembling the coupler and gripping the ends of the pipes P within the coupler member 30, the corrugated sleeves 36 are placed in position within the operating members 32 and against the tapers 40 upon the operating nut 32. The nuts 32 are then threaded upon the coupler member until the other ends of the corrugated sleeves touch the tapers 35 upon the coupler member and the ends of the pipe are inserted therein. Tightening of the operating members or nuts 32, draws the tapers 35 and 40 towards each other or moves the operating member longitudinally of the coupler member and produces a contraction of the corrugated sleeve 36 about the circumference of the pipe P which closes the longitudinally extending slot 41. This first action does not reduce the length of the sleeve but produces the first or flexible contraction of the sleeve. Continued tightening of the operating member 32 produces a shortening or a contraction in the length of the corrugated sleeve 36. In shortening the length of the corrugated sleeve 36, the radial thickness thereof is increased which in turn contracts the inside diameter of the sleeve and produces a second contraction of the sleeve. In other words, the corrugated sleeve having a longitudinally extending slot is subjected to a double contraction in gripping the unthreaded ends of the pipe therein.

It is clear that a corrugated member may be used whose length is reduced or contracted which in turn brings about an over-all increase in the thickness of the member which is capable of gripping and securely anchoring an unthreaded pipe within the coupler. In the better construction a corrugated sleeve may be used which is contracted through the longitudinal contraction thereof by reducing the length of the sleeve by pressure upon its ends which in turn produces an increase in the radial thickness of the sleeve or member. This increase in the radial thickness also produces a decrease or contraction in the inside diameter of the corrugated sleeve. Obviously, corrugated members which are any portion of a complete sleeve are contemplated by the invention.

As pointed out above, the corrugated sleeve may consist of more than two corrugations and the coupler of Figure 6 shows such a sleeve 45 having four grooves or corrugations. This sleeve carries a slot 46 extending longitudinally thereof at an angle to the axis of the sleeve which slot renders the same flexibly contractile. The pipes P are inserted in an opening in the coupler member 50 so that the ends of the pipe abut against the central ridge 51.

The coupler member or sleeve 50 of Figure 6 carries an internal recess 47 into which the corrugated sleeve 45 is inserted. The inner end of the recess 47 carries a taper 48 which taper is engaged by one end of the corrugated sleeve 45. The threaded operating members or nuts 53 engage the threaded ends 54 of the coupler member 50 to produce relative longitudinal movement therebetween. The operating member 53 has a taper 55 which engages the other end of the corrugated sleeve 45 to produce a double contraction of the sleeve.

The double contraction of the corrugated sleeve 45 is brought about by the cooperating tapers 48 and 55 upon the coupler member and operating member respectively engaging the ends of the corrugated sleeve to flexibly contract the sleeve upon the pipe which closes the longitudinally extending slot 46. Continued longitudinal movement of the operating member and the taper carried thereby brings about a contraction in the length of the corrugated sleeve 45 which contraction increases the radial thickness of the corrugated sleeve and thereby decreasing the internal diameter of the corrugated sleeve as previously described. This double contraction of the sleeve firmly grips the unthreaded end of the pipe P within the coupler.

The corrugated sleeves 36 and 45 have longitudinally extending slots which are at an angle to the axis of the sleeve. In addition, the edges of the sleeves at the slot are offset from each other so that the flexible contraction of the sleeve which closes the slot will bring these edges into contact with each other and the subsequent longitudinal contraction which increases the radial depth or thickness of the sleeve brings the edges of the sleeve at the slot forcibly together to form a moisture tight seal therebetween. Other constructions of the slot have the same function and produce the same result as the straight slots 41 and 46 which are at an angle to the axis of the respective corrugated sleeves 36 and 45 as will be discussed and described hereinafter.

In order to more clearly illustrate and describe the double contracting action of the corrugated sleeve described herein, the Figures 8 through 10 have been included showing the action of the corrugated sleeve. In Figure 8 the operating member or nut 53 is shown sufficiently tight so that the corrugated sleeve 45 has been circumferentially contracted which closes the longitudinally extending slot 46. A certain amount of gripping of the pipe P has taken place by this flexible contraction of the corrugated sleeve. The enlarged section of the sleeve in Figure 9 shows the inner surface or the inner faces of the corrugations of the sleeve engaging the pipe P.

The enlarged cross-section in Figure 10 shows the length of the sleeve 45 shortened or contracted which increases the radial over-all depth or thickness of the corrugated sleeve 45 and thereby produces a second contraction of the corrugated sleeve in that the inside diameter of the sleeve is reduced because of the axial or longitudinal shortening thereof. This double contraction of the corrugated sleeve produces a powerful gripping action upon the unthreaded end of the pipe inserted within the coupling. It is clear that the corrugated sleeve may also grip the end of the pipe merely by utilizing the contraction brought about by the increased over-all thickness resulting from the longitudinal contraction or shortening in the length of the sleeve.

The corrugated sleeves shown in Figures 1 through 10 are provided with a longitudinally extending slot which is at an angle to the axis of the sleeve. The edges of the sleeve at the slot are offset so that upon contraction of the sleeve these edges are brought forcibly together and thereby produce a moisture proof seal with the coupler. Other forms of longitudinally extending slots are contemplated by the invention and some of the forms of such slots are shown in Figures 11 through 16.

The corrugated sleeve 59 in Figure 11 has a portion 60 of the slot 61 extending circumferentially of the sleeve thereby producing adjacent projections at the slot upon the corrugated sleeve. Preferably, the combined width of the projections is greater than the width of the sleeve so that upon longitudinal contraction of the sleeve, the edges of the circumferential portion 60 of the slot are brought forcibly together to produce a moisture tight seal.

In Figures 13 and 14 the corrugated sleeve 63 has a longitudinally extending slot in which portions 64 thereof are at an angle to the axis of the sleeve, and in addition, the edges of the sleeve at the slot are offset from each other. The sleeve is shown in contracted position in Figure 14 in which the angular portions 64 of the longitudinally extending slot forcibly engage to form a tight seal.

Figures 15 and 16 show a coupler 66 having a longitudinally extending slot in which there are two circumferential portions 67, the edges of which circumferential portions of the slot are forcibly brought together during longitudinal contraction of the sleeve to form a tight seal therebetween, as illustrated in Figure 16. The action of the sleeve in this construction is similar to the action of the sleeve of Figures 11 and 12, excepting that a double seal is provided.

The coupler described herein may be used to couple the unthreaded end of a single pipe to some other structure, such as the box B shown in Figure 18. The box B carries a threaded sleeve 70 having an opening therein to receive the unthreaded end of the pipe P. The box may also be provided with a bushing 71 against which the end of the pipe abuts to limit its movement therein. The end of the sleeve 70 carries a taper 72 against which one end of the corrugated sleeves 73 abuts. A threaded nut 75 is provided with a taper 76 which engages the other end of the corrugated sleeve 73 to produce contraction thereof and grip the pipe within the coupler. The corrugated sleeve 73 may be similar to any one of the sleeves shown in the Figures 1 through 16 and described above. This sleeve utilizes the double contraction described in detail above in order to grip the pipe within the coupler.

The corrugated sleeve 77 illustrates another form of corrugated sleeve in which one of the corrugations 78, which preferably is the center one, is larger both longitudinally and radially than the other corrugations. The split sleeve 77 is also smaller in diameter than the sleeve 73 because it is adapted to receive a thin walled pipe. The corrugated sleeve 77 is inserted partly within the opening in the stud or coupler member 70 until the larger corrugation 78 engages the taper 72 on the end of the member. Now the operating means or member 79 is practically identical with the operating member 75 excepting that the opening or hole in its end is smaller in diameter so that it will receive without excess clearance, a thin walled pipe $p$. Upon tightening the operating nut 79, the corrugated sleeve is flexibly contracted by the coacting taper 72 engaging the large corrugation 78 and the end of the corrugated sleeve 77 being engaged by the taper 80 upon the operating member 79. A firm grip of the pipe P is obtained by a sleeve of this form.

The coupler members 70 upon each end of the box B are identical in size and by the construction of the coupler described, both a thin walled pipe $p$ and a thick walled pipe P may be coupled therein. The diameter of the opening in the coupler members 70 is large enough to receive the thick walled pipe P and the corrugated sleeve 73 is contracted by the tapers 72 and 76 engaging the ends of the sleeve. The thin walled pipe $p$ leaves a space between the outer wall thereof and the inner wall of the opening in the coupler member 70. The corrugated sleeve for the thin walled pipe is smaller in diameter than the sleeve 73 so that the sleeve may be the same type of sleeve as shown in Figure 6 which projects into the coupler member or the sleeve may be the sleev 7 having an enlarged corrugation between its ends such as the corrugation 78 in the center of the sleeve, which corrugation engages the taper 72 on the end of the coupler member. The operating means or member 79 is the same as the operating member 75 excepting the hole in its end is smaller because of the smaller pipe received therethrough.

A continuous ring 85 of a very thin material, such as thin metal, may be provided to engage the end of the corrugated sleeve 77. This continuous ring is U-shaped in cross-section with the open end of the U at the side thereof so that the end of the corrugated sleeve may be received therewithin. The continuous ring 85 is positioned upon either end of the corrugated sleeve so that it is engaged by a taper and upon tightening of the operating member 79 thereupon, a moisture and air tight seal is produced for the coupler. The ring is so thin that it is readily bent and pressed to seal the joint at the pipe and at the taper which engages the continuous ring upon the end of the corrugated sleeve. This ring has a thickness in the neighborhood of .008 of an inch which will give some indication of its flexibility and ability to conform and seal the joints in the coupler.

Other modifications will occur to those skilled in the art and the invention is not to be limited by the specific forms illustrated and described herein excepting as set forth in the accompanying claims.

What is claimed is:

1. A pipe coupler comprising a threaded coupler member having an opening therein to receive at least one pipe, contractile means including a flexible sleeve to embrace the pipe and having one end of the sleeve engaging the coupler member, an operating member engaging the other end of the contractile means, the contractile means including a continuous ring of thin material carried upon one end of the sleeve and engaged by one of the members, and threads upon the operating member engaging the threads on the coupler member to move the former axially with respect to the coupler member to contract the sleeve.

2. A pipe coupler comprising a threaded coupler member having an opening therein to receive at least one pipe, a corrugated sleeve to embrace the pipe and one end engaging the coupler member, operating means engaging the other end of the sleeve, a continuous ring of thin material carried upon one end of the sleeve, and threads upon the operating means engaging the threads on the coupler member to move the former axially with respect to the coupler member and contracting the sleeve axially thereby reducing the inside diameter thereof.

3. A pipe coupler comprising a threaded coupler member having an opening therein to receive at least one pipe, a corrugated sleeve to embrace the pipe and having a longitudinal split, one end of the sleeve engaging the coupler member, operating means engaging the other end of the sleeve, a continuous ring of thin material carried upon one end of the sleeve, and threads upon the operating means engaging the threads on the coupler member to move the former axially with respect to the coupler member and producing a double contraction of the sleeve.

4. A pipe coupler comprising a threaded coupler member having an opening therein to receive at least one pipe, a taper carried by the coupler member, a corrugated sleeve to embrace the pipe and having a longitudinal split, one end of the sleeve engaging the taper upon the coupler member, operating means having a taper engaging the other end of the sleeve, a continuous ring of thin material carried upon one end of the sleeve, and threads upon the operating means engaging the threads on the coupler member to move the former axially with respect to the coupler member to produce a double contraction of the sleeve.

5. A pipe coupler comprising a threaded coupler member having an opening therein to receive at least one pipe, a taper carried by the coupler member, a corrugated sleeve to embrace the pipe and having a longitudinal split, one end of the sleeve engaging the taper upon the coupler member, operating means having a taper engaging the other end of the sleeve, a continuous U-shaped ring of thin material carried upon one end of the sleeve, and threads upon the operating means engaging the threads on the coupler member to move the former axially with respect to the coupler member and producing a double contraction of the sleeve.

6. A pipe coupler comprising a threaded coupler member having an opening therein to receive at least one pipe, a recess within the opening in the coupler member, a taper at the bottom of the recess, a corrugated sleeve received within the recess to embrace the pipe and having a longitudinal split, one end of the sleeve engaging the taper within the recess, operating means having a taper engaging the other end of the sleeve, a continuous ring of thin material carried upon one end of the sleeve, and threads upon the operating means engaging the threads on the coupler member to move the former axially with respect to the coupler member and producing a double contraction of the sleeve.

7. A coupler for the coupling of an unthreaded pipe which comprises a coupler member having a thread thereon, a threaded cooperating part adapted to fit the thread of the coupling member, a corrugated sleeve having a slit therethrough adapting it for initial tightening to provide for commercial variations in the size of pipe, said sleeve being adapted to fit over the pipe to be coupled and within the said coupler member, means associated with the said threaded cooperating part for producing wedging action on said sleeve to force the sleeve into pressure engagement with said pipe, whereby when the said threaded cooperating part is screwed home the said corrugations are longitudinally contracted and transversely thickened to firmly hold said pipe in place in the coupler member.

8. A coupler for the coupling of an unthreaded pipe which comprises a coupler member having a thread thereon, a threaded nut adapted to fit the thread of the said coupler member, a corrugated sleeve having a slit therethrough adapting it for initial tightening to provide for commercial variations in the size of pipe, said sleeve being adapted to fit within the said nut and over the end of the pipe to be coupled, means associated with said nut and coupler member for producing wedging action on the said corrugated sleeve to force the same into close fitting engagement with the pipe end, whereby when the nut is screwed home the said corrugations are longitudinally contracted and transversely thickened to lock said pipe in place.

9. A pipe coupler comprising a coupler member having a threaded portion, a screw-threaded nut member adapted to engage said screw threaded portion, an opening through said nut member adapted to hold a pipe to be coupled, a corrugated sleeve having a slit therethrough, at least one of the corrugations of said sleeve being larger than the others, said sleeve being adapted to fit over the end of the pipe to be coupled and within at least one of said members, wedge portions on said coupling member and upon said nut member engaging both sides of said sleeve and adapted to force said sleeve into pressure engagement with said pipe, whereby as said nut member is turned into place it operates to force the portions adjacent the slit in said sleeve toward each other and to expand the said sleeve transversely to produce thickened corrugations which, when the said threaded nut member is screwed into place, will serve to effectively hold the said pipe.

10. A coupler for the coupling of an unthreaded pipe which comprises a coupler member having a thread thereon, a threaded nut member adapted to engage the thread of the said coupler member, a corrugated sleeve having a slit therethrough, said corrugations having knurling or projections adapted to provide biting contact with said pipe, said sleeve being adapted to fit within one of said members and over the end of the pipe to be coupled, means associated with said nut and coupler member for producing wedge action on the said corrugated sleeve to force the same into close fitting engagement with the pipe end, whereby when the nut is screwed into place the said corrugations are longitudinally contracted and transversely thickened to lock said pipe in place.

LEWIS H. CHURCH.